United States Patent [19]
Nishiyama

[11] Patent Number: 5,725,933
[45] Date of Patent: Mar. 10, 1998

[54] WORKING PROTECTION COVER AND PARTS THEREOF AND METHOD OF MANUFACTURING THE WORKING PROTECTION COVER

[76] Inventor: Hidetoshi Nishiyama, 11-21, Hatsucho, Neyagawa-shi, Osaka-fu, Japan

[21] Appl. No.: 684,549

[22] Filed: Jul. 19, 1996

Related U.S. Application Data

[62] Division of Ser. No. 464,972, Jun. 5, 1995, Pat. No. 5,585,179, which is a division of Ser. No. 176,903, Jan. 3, 1994, abandoned.

Foreign Application Priority Data

| | | | |
|---|---|---|---|
| Jan. 8, 1993 | [JP] | Japan | 5-1470 |
| Apr. 1, 1993 | [JP] | Japan | 5-74879 |
| May 21, 1993 | [JP] | Japan | 5-119381 |
| Jul. 6, 1993 | [JP] | Japan | 5-165814 |

[51] Int. Cl.$^6$ .................. B65D 65/08; B65D 85/68
[52] U.S. Cl. .............. 428/192; 150/166; 150/167; 428/317.3; 428/343; 442/394
[58] Field of Search .............. 150/166, 167; 428/317.3, 317.7, 343, 198, 284, 286, 192; 296/136; 442/381, 394

[56] References Cited

U.S. PATENT DOCUMENTS

| | | | |
|---|---|---|---|
| 3,649,436 | 3/1972 | Buese | 428/317.3 |
| 3,910,330 | 10/1975 | Johnson et al. | 150/166 |
| 4,163,818 | 8/1979 | Wernli | 428/138 |
| 4,169,184 | 9/1979 | Pufahl | 428/337 |
| 4,315,535 | 2/1982 | Battle | 150/166 X |
| 4,316,926 | 2/1982 | Kaminstein | 428/137 |
| 4,358,489 | 11/1982 | Green | 428/31 |
| 4,484,574 | 11/1984 | DeRusha et al. | 128/156 |
| 4,554,193 | 11/1985 | Erickson | 428/40 |
| 4,563,388 | 1/1986 | Bonk et al. | 428/304.4 |
| 4,726,976 | 2/1988 | Karami et al. | 428/137 |
| 4,726,982 | 2/1988 | Traynor et al. | 428/213 |
| 4,763,783 | 8/1988 | Talbot | 150/166 X |
| 4,925,724 | 5/1990 | Ogden | 428/137 |
| 5,029,933 | 7/1991 | Gillem | 150/166 X |
| 5,098,786 | 3/1992 | Hanke | 428/343 |
| 5,127,974 | 7/1992 | Tomiyama et al. | 150/166 X |
| 5,151,314 | 9/1992 | Brown | 428/198 |
| 5,193,724 | 3/1993 | Robbins | 150/167 X |
| 5,264,278 | 11/1993 | Mazurek et al. | 428/317.3 |
| 5,318,835 | 6/1994 | Sawamoto et al. | 428/317.7 |
| 5,334,447 | 8/1994 | Kitamura et al. | 428/317.3 |
| 5,343,915 | 9/1994 | Newsome | 150/166 |
| 5,585,179 | 12/1996 | Nishiyama | 428/343 |

*Primary Examiner*—Daniel Zirker
*Attorney, Agent, or Firm*—D. Peter Hochberg; Mark Kusner

[57] ABSTRACT

A working protection cover 1, 8 for preventing a vehicle body from becoming damaged during an automobile assembly line operation is free from the possibility of easily slipping off position upon mere contact of an operator with the cover, and has good durability. The working protection cover 1, 8 comprises a thermoplastic resin sheet 9 and a cloth-made sheet 10 bonded to the back of the thermoplastic resin sheet 9. The working protection cover 1, 8 has a non-slip tape 17 bonded to the back thereof, the non-slip tape 17 being made from a foam material made from a polyolefin resin and a synthetic rubber in combination. The working protection cover 1, 8 is fitted with a locking element 24, 40 for locking the cover 1, 8 to a vehicle body.

5 Claims, 11 Drawing Sheets

WORKING PROTECTION COVER AND PARTS THEREOF AND METHOD OF MANUFACTURING THE WORKING PROTECTION COVER

This is a divisional of application Ser. No. 08/464,972, now U.S. Pat. No. 5,585,179, filed on Jun. 5, 1995, which is a divisional of U.S. application Ser. No. 08/176,903 filed Jan. 3, 1994, now abandoned.

FIELD OF THE INVENTION

This invention relates to a working protection cover and parts thereof for use in, for example, an automobile assembly line for protecting vehicle bodies against any possible damage, and to a method of manufacturing the working protection cover.

BACKGROUND OF THE INVENTION

In automobile assembly line operations, there may sometimes occur a trouble such that the coated surface of a vehicle body becomes damaged as a tool or a part comes in contact with the body. Techniques for preventing such a trouble are known as described in, for example, Japanese Laid-Open Utility Model Application No. 60-85220. In this known technique, a synthetic resin-made working protection cover for damage prevention is used to cover various automotive parts, such as fenders, bumpers, doors, hoods, side panels, side sills, and trunk lids, for protection from possible damages. Such a working protection cover includes a cover body, and a locking edge formed along the outer peripheral edge of the cover body which is to be brought in locking engagement with an outer peripheral portion of an automotive fender, bumper or the like to enable the same to be covered. However, such a cover involves a problem that it may easily slip off the surface upon a mere contact of an operator with the cover because it is comprised of a soft synthetic resin film.

A cover of this type is constructed of a thermoplastic PP (polypropylene) sheet with a PE (polyethylene) foam plastic sheet bonded to the inner peripheral surface of the PP sheet. This working protection cover is manufactured in such a way that a sheet base is first fabricated by bonding a PE foam plastic sheet to the back of a PP sheet and then the sheet base is heated and pressed by a forming die so as to form a cover of a particular configuration. Unfortunately, such a conventional type working protection cover has disadvantages arising from the difference in shrinkage between the PP sheet and the PE foam plastic sheet, the shrinkage factor of the former sheet being smaller and that of the latter being larger. That is, because of such difference in shrinkage, the cover tends to curl in course of time, thus becoming unusable or losing much of its performance characteristics. Further, the PE foam plastic sheet is likely to become damaged and lacks durability.

DISCLOSURE OF THE INVENTION

It is a primary object of the invention to provide a working protection cover which is unlikely to easily slip off a surface by the operator merely touching the cover, is not liable to become deformed with time, and has good durability characteristics, and a method of manufacturing such a working protection cover.

In order to accomplish this object, the working protection cover in accordance with the invention comprises a thermoplastic resin sheet and a cloth-made sheet bonded to the back of the thermoplastic resin sheet.

Constructed as above described, the working protection cover involves no shrinkage difference between the thermoplastic resin sheet and the cloth-made sheet, thus being free from the possibility of curling itself in course of time, and having good durability.

A non-slip tape for preventing the working protection cover from slipping off a surface is comprised of a foam material made from a polyolefin resin and a synthetic rubber and is of a belt-like form, the back side of the non-slip tape being self-adhesive.

Constructed as such, the non-slip tape bonded to the back of the working protection cover can come in contact with the coated surface of the vehicle body to positively prevent the cover from slipping off the surface. Furthermore, since the non-slip tape is comprised of a foam material made from a polyolefin resin and a synthetic rubber in combination, it is highly resistant to tensile and tearing forces and can be used for long without being replaced. When an old non-slip tape is to be peeled off, there is no possibility of the non-slip tape being torn off with a part thereof remaining unseparated from the cover. This permits easy replacement of the non-slip tape.

A locking element for preventing the working protection cover from slipping off a surface comprises a plate-like locking element body having a U-shaped locking portion formed at the forward end thereof, a median portion of the locking element body being obtusely bent in a direction opposite from the direction in which the locking portion is bent. The locking element body has a resilient member attached to its rear end. Constructed as above described, the locking element floats at its rear end off the vehicle body; therefore, when the locking element body is pulled rearward by means of the resilient member, the locking portion at the forward end of the locking element body goes into firm locking relation with the body according to the theory of lever. Once locked, the locking element will not become displaced or disengaged except under some abnormal force.

In another embodiment, the plate-like locking element body is obtusely bent at its median portion in the same direction as the direction in which the locking portion is bent. Constructed as such, the locking element permits attachment and removal of a mat guard while the locking element is held in its locking position, and therefore it provides for improvement in operating efficiency. The locking element is very easy to attach and remove, and exhibits accurate locking performance.

DESCRIPTION OF THE EMBODIMENTS

Figure 1:
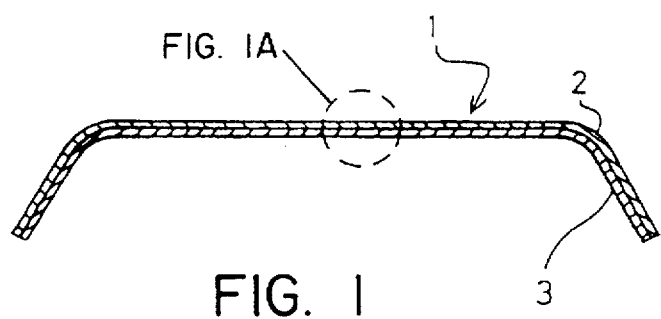
FIG. 1 and 1A is a sectional view of a working protection cover representing one embodiment of the invention, with a partial sectional view thereof separately shown.
Figure 1A:
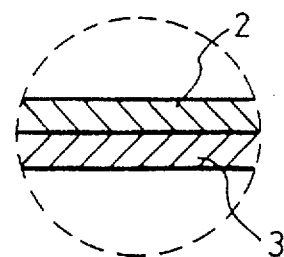

FIG. 1 shows a working protection cover representing one embodiment of the invention. The working protection cover, designated 1, comprises a thermoplastic resin sheet 2 and a cloth-made sheet 3 bonded to the back of the thermoplastic resin sheet 2. The thermoplastic resin sheet 2 is made of a polyolefin resin, such as PP (polypropylene), PE (polyethylene), or EVA (ethylene vinyl acetate), or of TPE (thermoplastic elastomer). The thermoplastic resin sheet 2 may be a foam plastic sheet made from a polyolefin resin and a synthetic rubber in combination. For the polyolefin resin, component is used PE and for the synthetic rubber component is used EPDM (ethylene-propylene-thereat diene monomer rubber). As for the expansion ratio of such foam plastic sheet, it may be suitable that the sheet is formed of a foam material having the expansion ratio of about 10 times. Needless to say, however, the expansion ratio is not limited to the order of 10 times.

For the cloth-made sheet 3 is used a non-woven cloth. However, it is understood that the cloth-made sheet 3 is in no way limited to non-woven cloth.

Figure 2:
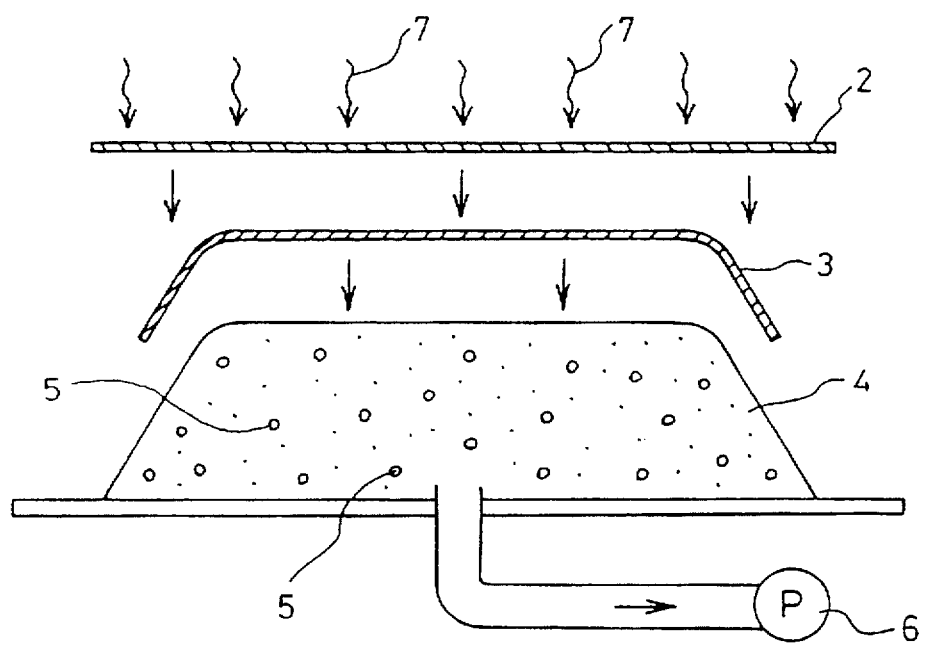
FIG. 2 is a schematic illustration showing a method of manufacturing a working protection cover of the one embodiment of the invention.

FIG. 2 schematically illustrates a method of manufacturing the protection cover 1. A forming die 4 is formed on its outer surface with a multiplicity of air vent holes 5 so that air is discharged by a pump 6 from the interior of the die 4 through the bottom thereof. A cloth-made sheet 3 cut to a given shape is placed on the die 4, and a thermoplastic resin sheet 2 cut to a given shape and heated and softened by heat 7 is pressed from above against the cloth-made sheet 3. Concurrently, the thermoplastic resin sheet 2 and the cloth-made sheet 3 being thus pressed against each other are formed into a specific configuration. The press-bonded sheets 2, 3 are cut so that unnecessary portions are eliminated.

Although not shown in FIG. 1, a non-slip tape for slip prevention is bonded to the inner side of the working protection cover 1 fabricated in the above described manner, and a locking element for locking the working protection cover 1 to an vehicle body is mounted in position.

Since the working protection cover 1 has a cloth-made sheet 3 bonded thereto on the inner side, it is free from the possibility of curling itself due to such deformation with time as may otherwise arise from any difference in shrinkage between the sheets 2 and 3, and yet has a higher degree of durability than any conventional PE expanded material.

Figure 3:
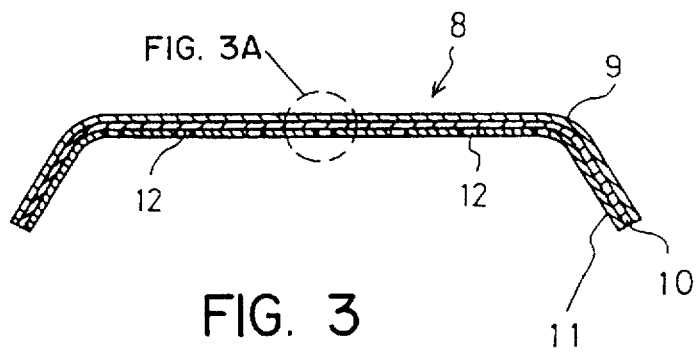
FIG. 3 and 3A is a sectional view of a working protection cover representing another embodiment of the invention, with a partial sectional view thereof separately shown.
Figure 3A:
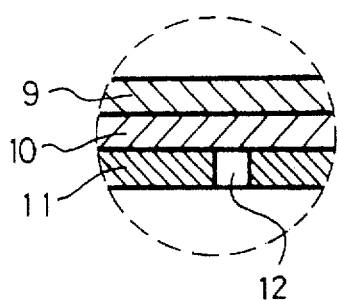

FIG. 3 shows a working protection cover representing a second embodiment of the invention. The working protection cover 8 of this embodiment is of a three-layer arrangement including, from the outer side, a thermoplastic resin sheet 9, a cloth-made sheet 10, and a stain preventive sheet 11. In this embodiment, the thermoplastic resin sheet 9 and the cloth-made sheet 10 are identical with those of the foregoing embodiment.

In this embodiment, the stain preventive sheet 11 which constitutes the third layer has a multiplicity of small holes formed thereon all over. This sheet 11 is a thin PE sheet and serves to prevent the cloth-made sheet 10 from getting stained.

Figure 4:
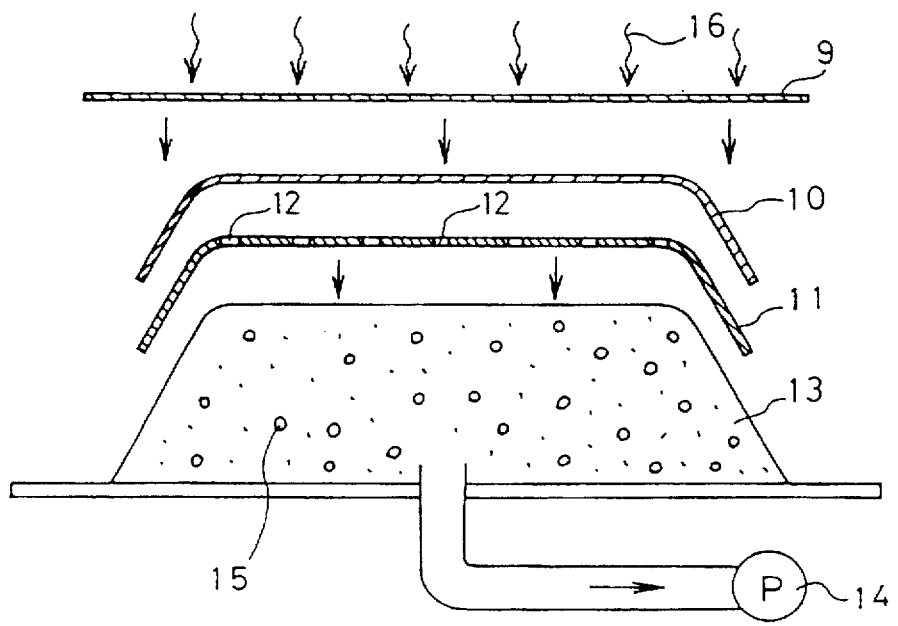
FIG. 4 is a schematic illustration showing a method of manufacturing a working protection cover of said another embodiment of the invention.

FIG. 4 illustrates a method of fabricating the working protection cover of the second embodiment. A die 13 is in such a condition that air is evacuated by a pump 14 through air vent holes 15. A cloth-made sheet 10 to which is press-mounted a stain prevention sheet 11 is placed on the die 13. Although the cloth-made sheet 10 with the stain preventive sheet 11 press-mounted thereon is placed on the die 13, air vent holes 15 will not fully be blocked but permit air to be discharged therethrough, because the sheet 11 is formed with a multiplicity of small holes 12 all over. Subsequently, a thermoplastic resin sheet 9 heated and softened by heat 16 is placed on the sheets 10, 11 and pressed together, whereupon the sheets 9, 10, 11 are formed into shape. Cutting is carried out to eliminate unnecessary portions. Thus, a working protection cover 8 is made.

In FIGS. 2 and 4, the thermoplastic resin sheet 9 is shown as being pressed downward from above. Alternatively, it may be arranged that pressing is effected upward from below.

Figure 5:
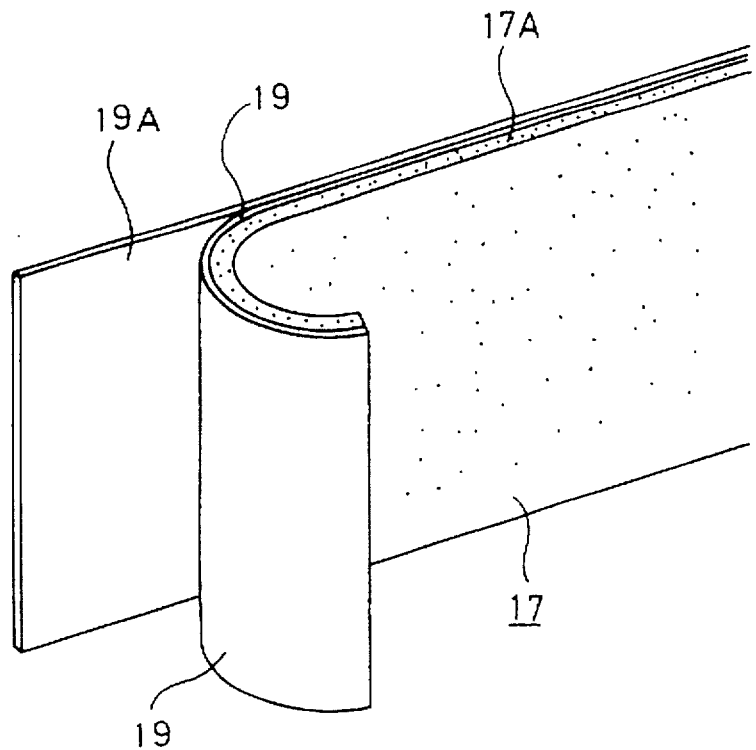
FIG. 5 is a perspective view of a non-slip tape of one embodiment of the invention.
Figure 5A:
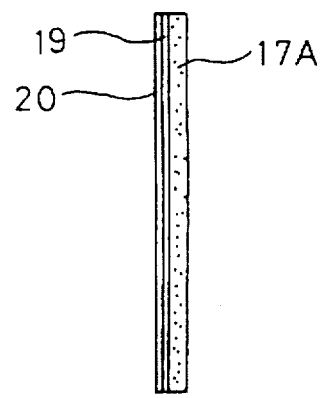
FIG. 5A is a longitudinal sectional view of the non-slip tape shown in FIG. 5.
Figure 6:
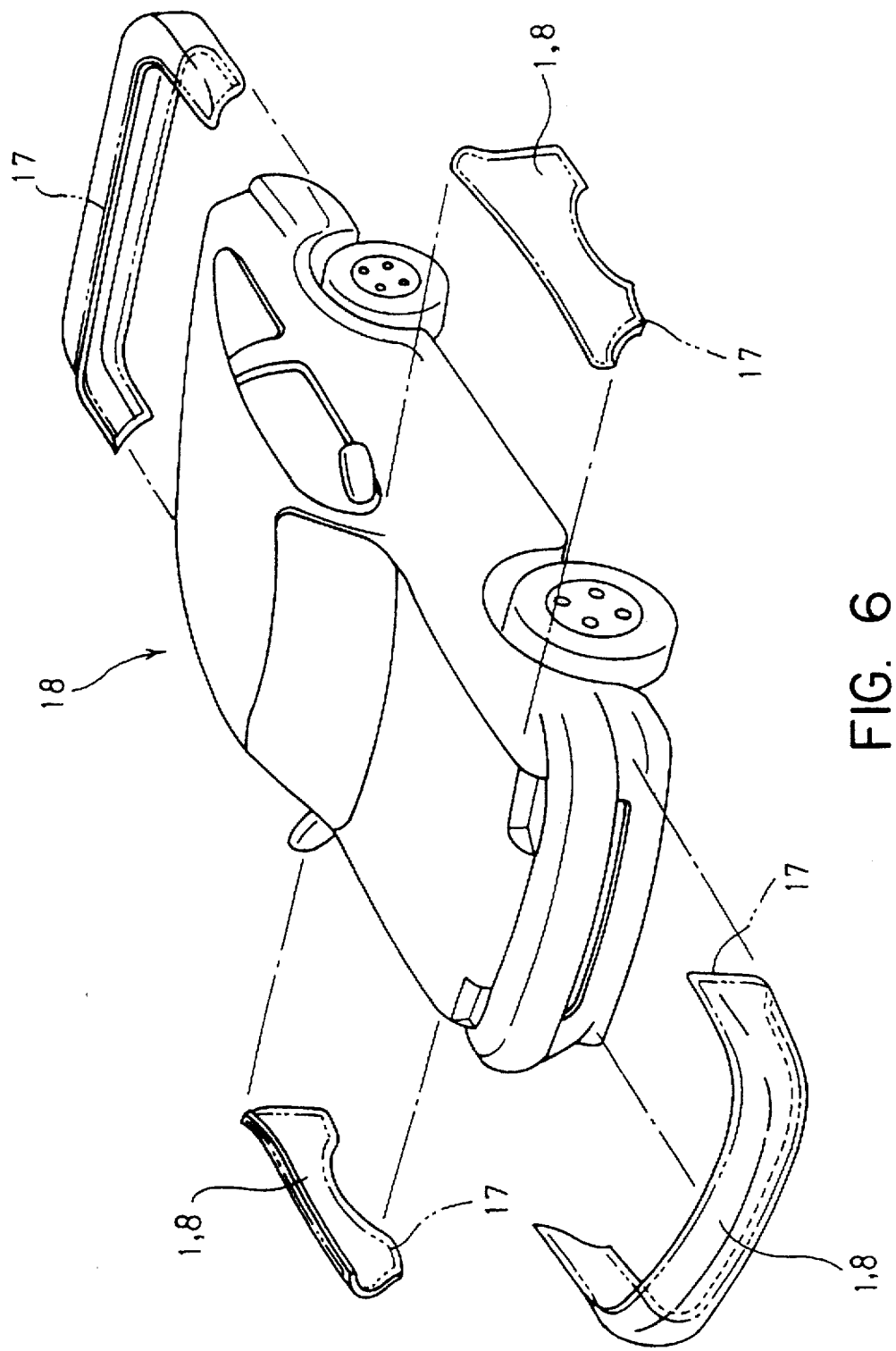
FIG. 6 is a perspective view showing an automobile assembly operation site.

FIG. 5 and FIG. 5A show a non-slip tape. This non-slip tape 17, as FIG. 6 shows, is bonded to the inner side of the working protection cover 1, 8 which protects a relevant portion of the body of an automotive car 18 assembled at an assembly factory, to prevent the working protection cover 1, 8 from slipping off the surface.

A tape 17A of the non-slip tape 17 is made of a foam material having an expansion ratio of about 10 times which is made from a polyolefin resin and a synthetic rubber, and is of a belt-like configuration with a width of several centimeters. The foam material having the expansion ratio of about 10 times is suitable as a material for the tape, but the material of the tape 17A is not limited to a material having the expansion ratio of about 10 times.

For the material of the tape 17A, polyethylene, for example, is used as the polyolefin resin component, and EDPM (ethylene-propylene-diene monomer rubber), for example, is used as the synthetic rubber component. This foam material having an expansion ratio of about 10 times which is formed of a combination of polyolefin resin and a synthetic rubber has a tensile strength of 12 kg/cm2 (JIS (Japanes Industrial Standards)-K6767), a tear strength of 4.2 kg/cm2 (JIS- K6767), and is highly resilient. As compared with a conventional foam material made solely from polyethylene, it is highly advantageous in durability.

The tape 17A has a double-coated adhesive tape 19 bonded to the back thereof. However, it is to be understood that a double-coated tape 19 is not necessarily bonded to the back of the tape 17; it is only required that the back should have an adhesive surface. The exposed side of the double-coated adhesive tape 19 is covered with a release paper 20 up to the point of time for its use. The release paper 20 is removed then the exposed side is used.

Figure 7:
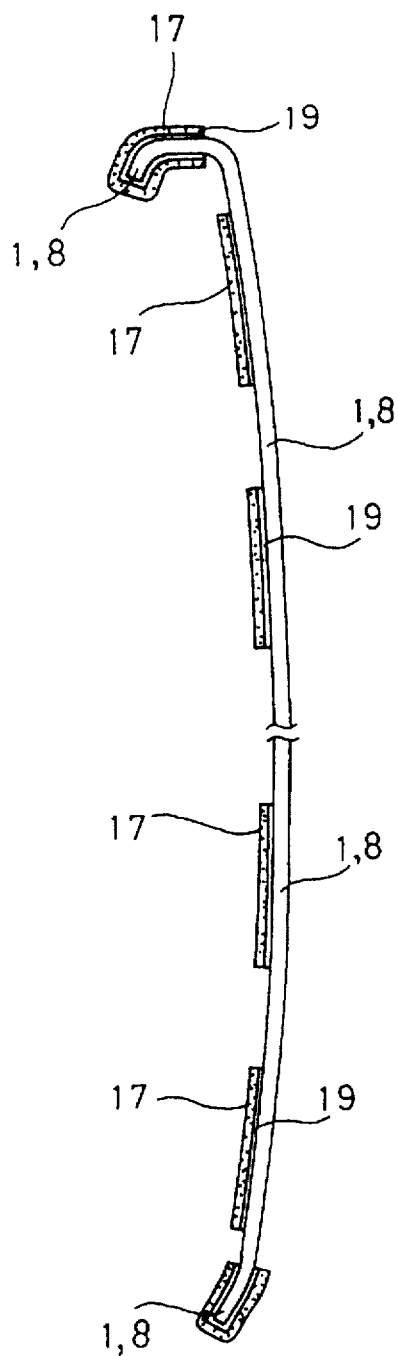
FIG. 7 is a sectional view showing non-slip tapes of one embodiment of the invention as attached to the cover.

The non-slip tape 17 is bonded to the outer peripheral edge of the cover 1, 8 as shown in FIG. 7 after the release paper 20 is removed and the tape is bent at a longitudinally median site thereof. Where necessary, non-slip tape 17 is also bonded to the interior of the cover 1, 8 as shown in FIG. 7. The non-slip tape has a large friction coefficient and, therefore, the cover 1, 8 is prevented from easily slipping off the surface.

Since the tape 17A of the invention is made from a foam material made from polyolefin resin and synthetic rubber components, the tape 17A is unlikely to cause any coat discoloration even when the tape 17A is held in prolonged contact with a coat surface as in a long factory vacation period.

Since the tape 17A is made from a foam material having an expansion ratio of 10 times, there is no possibility of the tape 17A damaging the coated surface of the automobile 18 because of a hard tape surface. Nor is there any possibility that the tape 17A becomes broken or torn off for reasons of the material being so soft. Therefore, when an old non-slip tape is required to be replaced, it is unlikely that the non-slip tape 17 will become torn off and adhere to the cover 1, 8, and this eliminates the necessity of removing any stuck piece of tape, which results in good improvement in operation efficiency.

Figure 8:
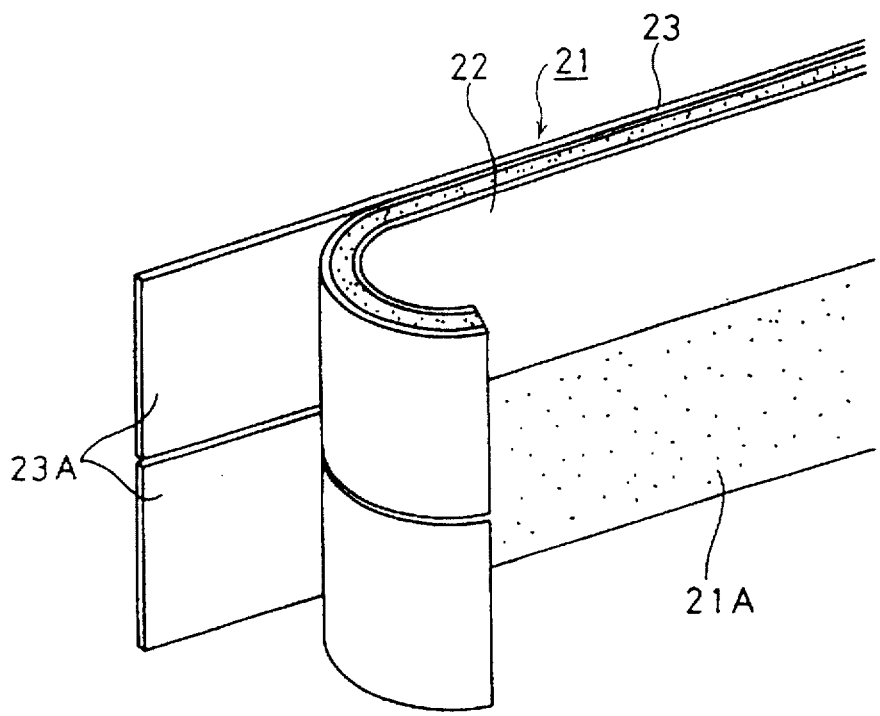
FIG. 8 is a perspective view of a non-slip tape of another embodiment of the invention.
Figure 8A:
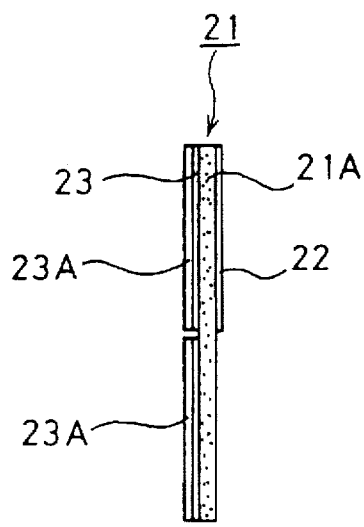
FIG. 8A is a longitudinal sectional view of the non-slip tape shown in FIG. 8.
Figure 9:
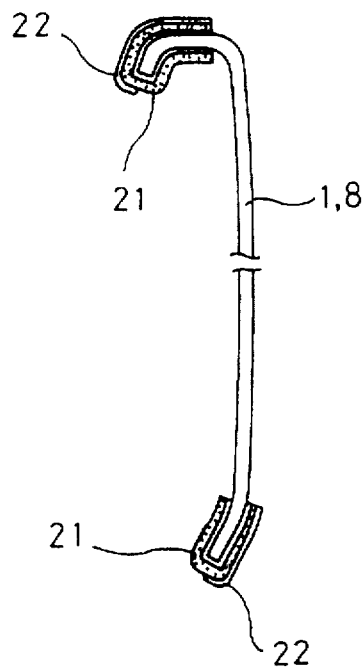
FIG. 9 is a sectional view showing non-slip tapes of another embodiment of the invention as attached to the cover.

FIG. 8 and FIG. 8A show another embodiment of non-slip tape of the invention. This non-slip tape 21 has a protective sheet 22 of PP (polypropylene) bonded to the surface of the tape 21A at one side of a longitudinal center line thereof. Two belt-like release paper sheets 23A are bonded to the back of the tape 21A. The non-slip tape 21 of this embodiment is bonded to the outer peripheral edge of the working protection cover 1, 8 after the release paper sheets 23A are removed and the tape is centrally bent, as shown in FIG. 9.

The non-slip tape 21 of this embodiment is of such an arrangement that the outer surface side of the protective sheet 22 which is likely to become stained and/or damaged most is protected, which can add to the durability of the non-slip tape 21. The plurality of covers 1, 8 can be placed one over the other when they are put in storage. Superposed plurality of covers 1, 8 are difficult to disengage from each other, because the friction coefficient of the non-slip tape 21 is considerably large. However, the protective sheet 22 affords ease of sliding of the plurality of covers 1, 8, which in turn permits easy separation of the covers. Further, by virtue of the protective sheet 22, the non-slip tape 21 can be easily bent along the longitudinal center line thereof, and this provides for ease of bonding of the non-slip tape 21 to the outer peripheral edge of the working protection cover 1, 8.

Figure 10:
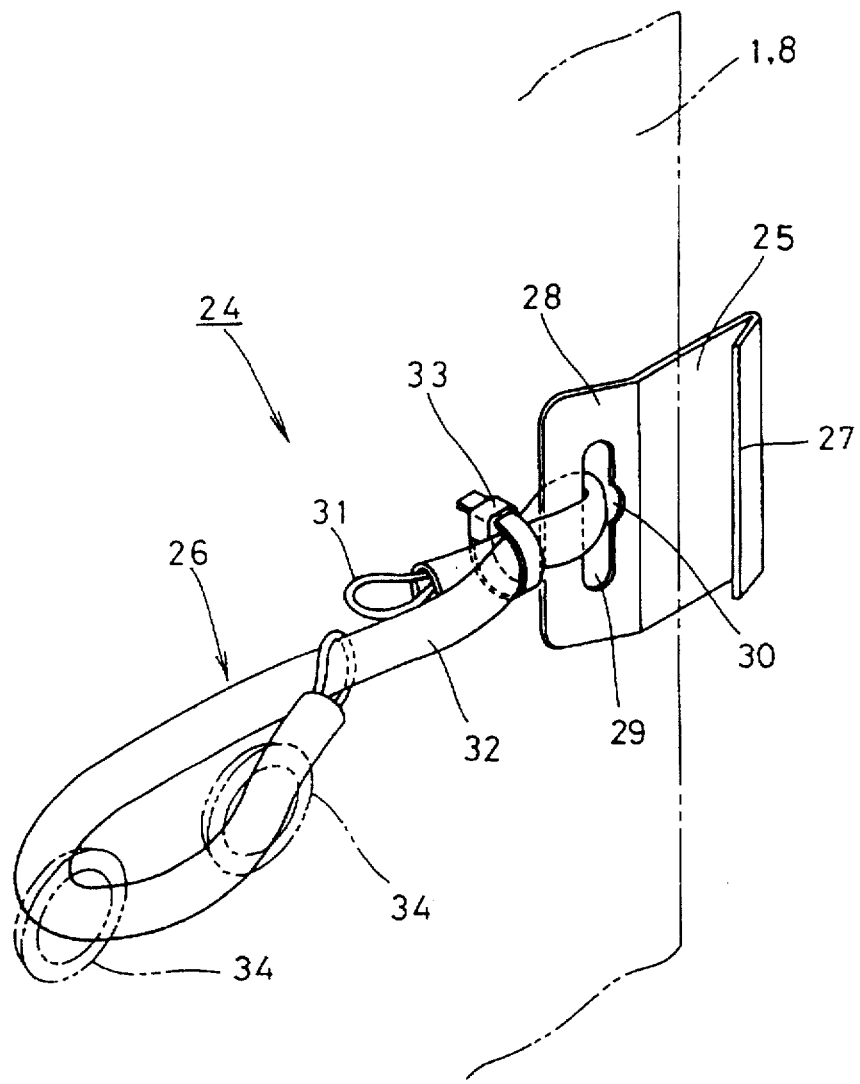
FIG. 10 is a perspective view showing a locking element for the working protection cover of one embodiment of the invention.

FIG. 10 shows one embodiment of a locking element of the working protective cover according to the invention. The locking element 24 comprises a locking element body 25 and a rubber-made resilient member 26. The locking element 25 is made of nylon, PP (polypropylene), PE (polyethylene) or the like, but without limitation thereto. The locking body 25 is comprised of a rectangular plate member such that the plate member has a forward end portion which is bent into a U shape to form a locking portion 27, a central portion which is obtusely bent in direction opposite from the direction in which the locking portion 27 is bent, and a rear end portion 28 formed with a transversely extending slot 29, with an arcuate notch 30 centrally formed in the slot 29.

A resilient member 26 comprising a rubber tube 32 and a rubber code fitted into the rubber tube 32 is passed through the slot 29, the resilient member 26 being banded at its proximal end by a fastening band 33. The rear end portion of the resilient member 26 is passed through two circular holes 34 formed in the working protection cover 1, 8.

Figure 11:
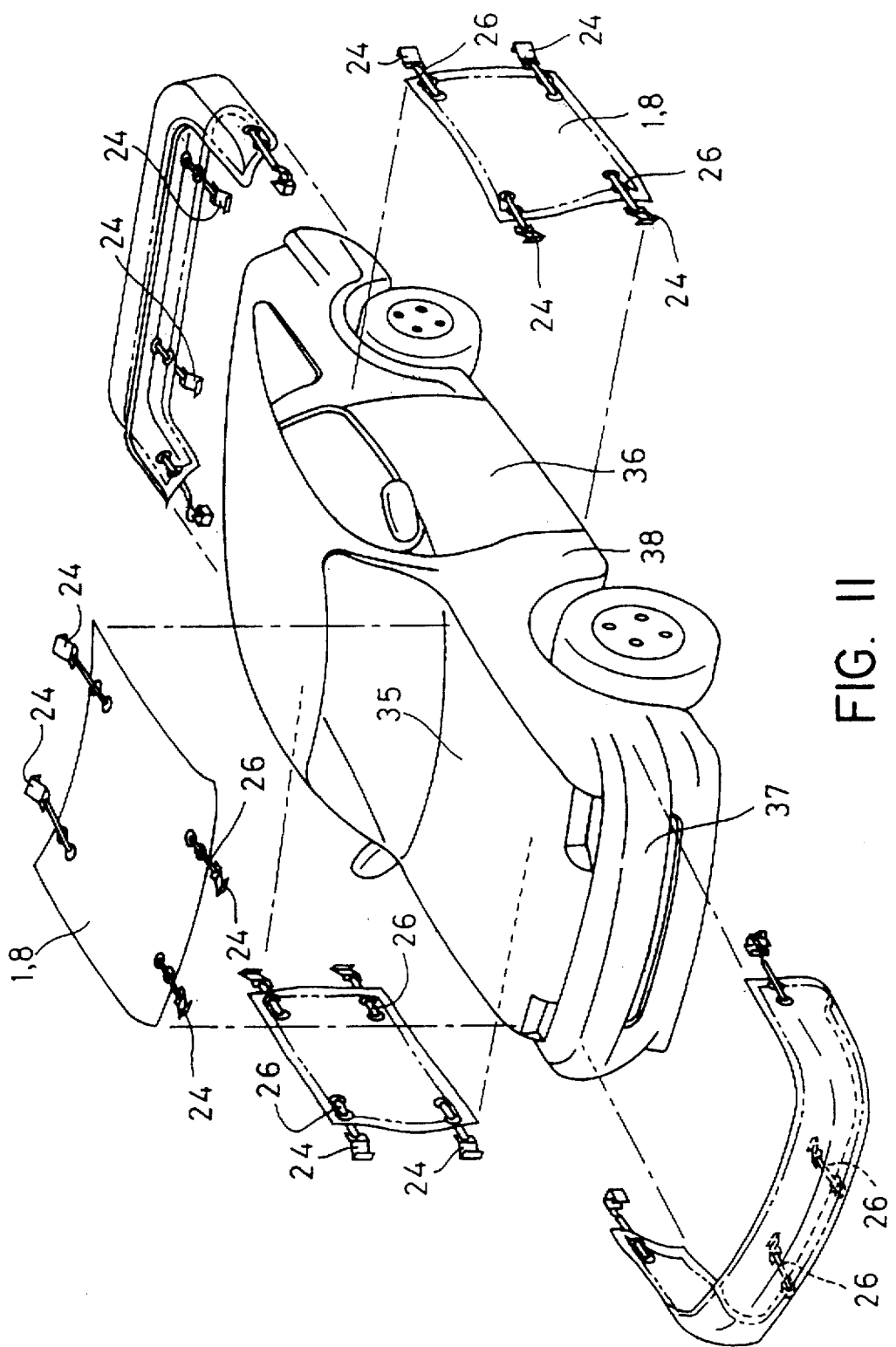
FIG. 11 is a perspective view showing an automobile assembly operation site.
Figure 12:
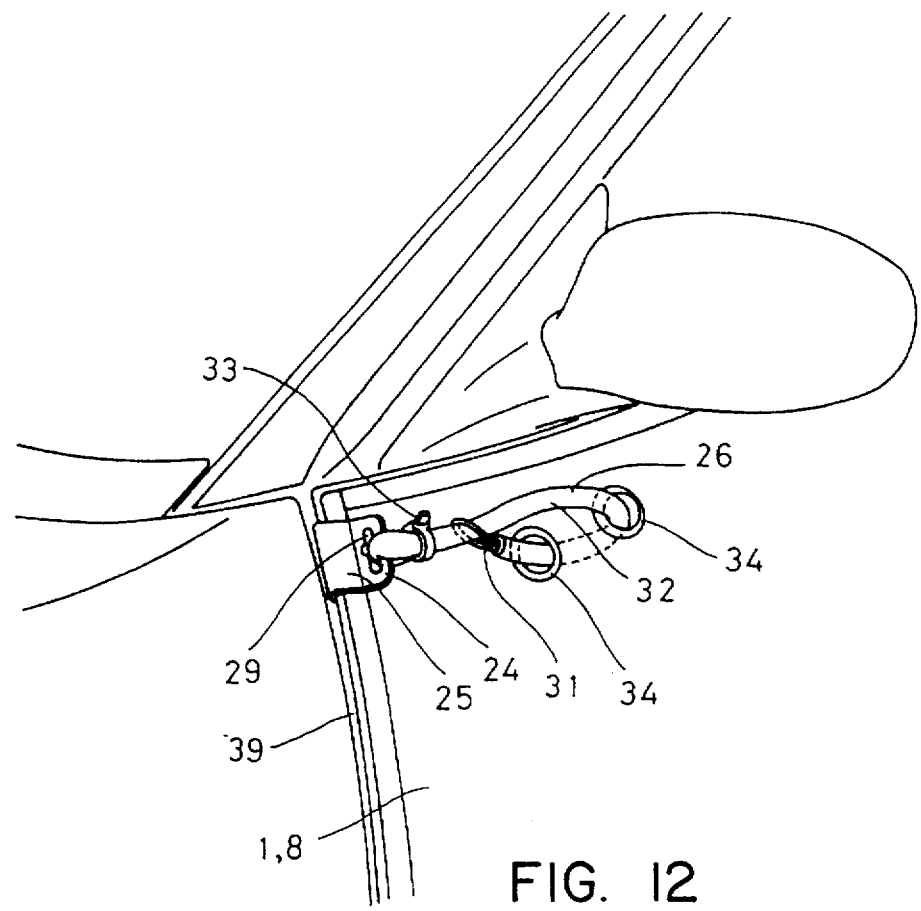
FIG. 12 is a perspective view of the locking element of the working protection cover according to the invention as seen when in use.

The locking element 24 is used for attaching the working protection cover 1, 8 to such automotive parts as bonnet 35, door 36, and bumper 37, as shown in FIGS. 11, 12.

Figure 13:
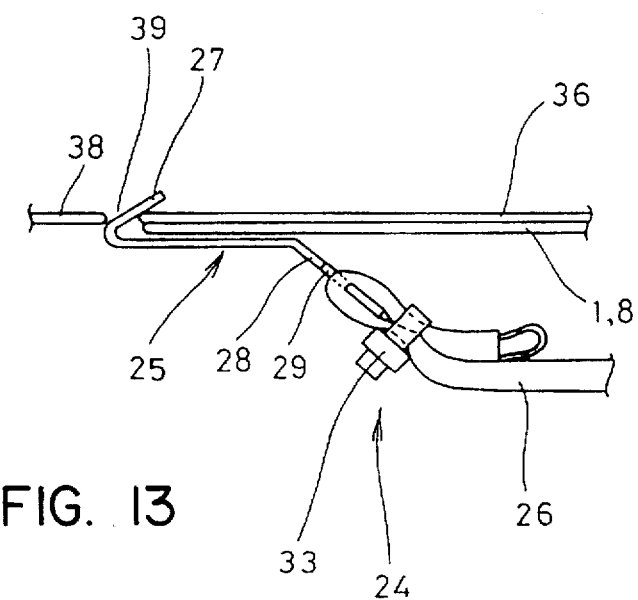
FIG. 13 is a sectional view of the locking element of the working protection cover according to the invention as seen when in use.

The locking element 24 is such that the plate member is constructed so thin that the locking element can be used even when only a narrow gap is available between the door 36 and the body 38. The rear end 28 of the locking element body 25 positioned slightly away from the door 36, as shown in FIG. 13, and therefore the locking portion 27 is rigidly pivotally locked to the door 36 so that it is most unlikely that the locking element 24 will slip out of position or become disengaged from the door. When the locking element 24 is to be disengaged, the operator can easily grasp the rear end 28 of the locking element body 25 which is positioned slightly away from the door, even if he wears a glove. Therefore, the locking element 24 is easy to remove.

Figure 14:
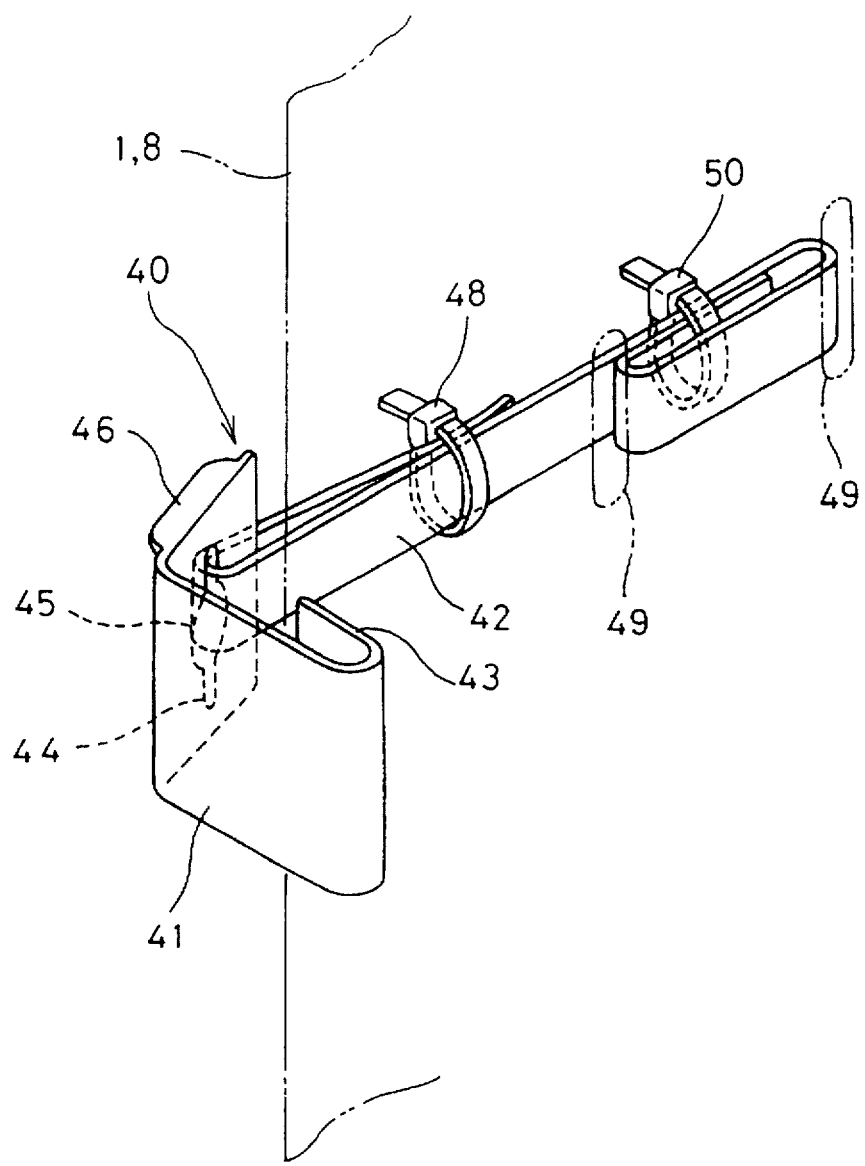
FIG. 14 is a perspective view of another form of locking element for the working protection cover of the invention.
Figure 15:
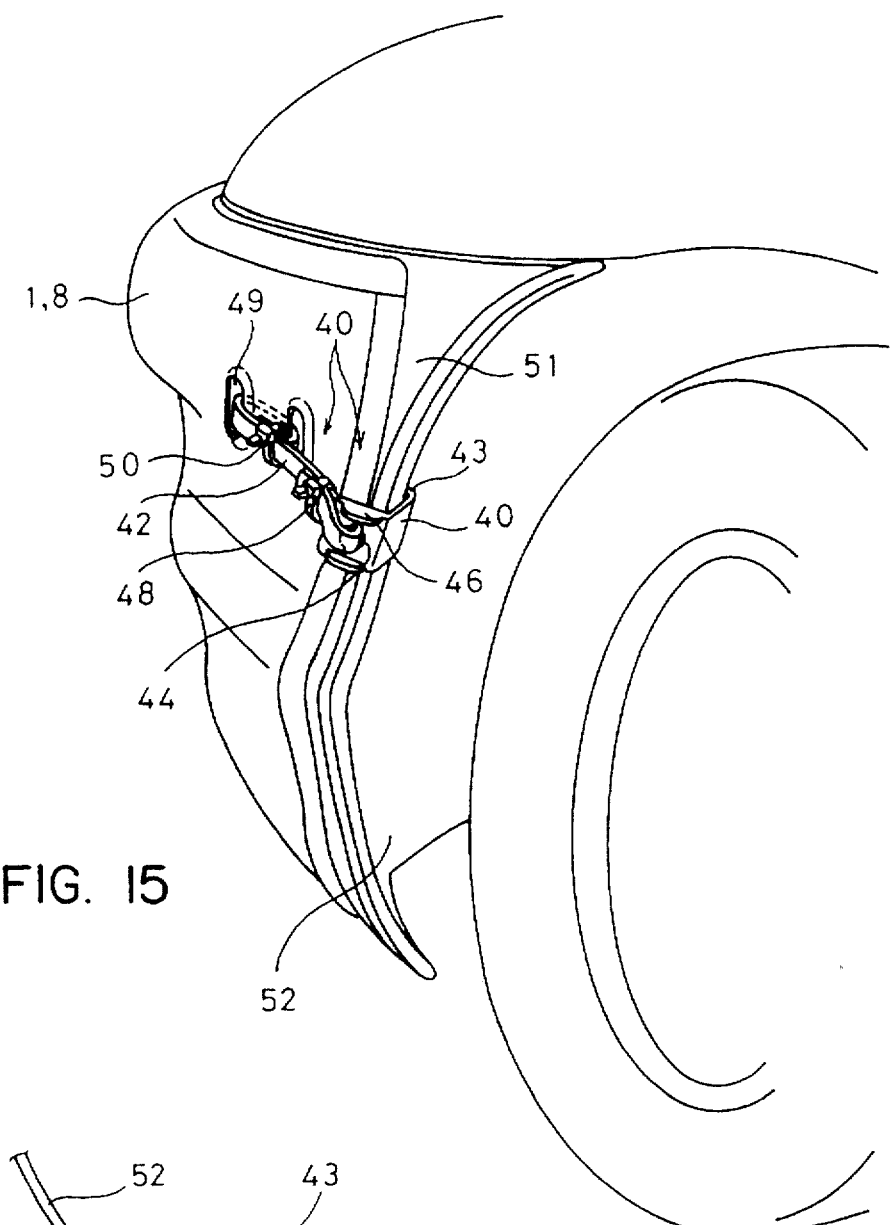
FIG. 15 is a perspective view of said another form of locking element for the working protection cover of the invention as seen when in use.
Figure 16:
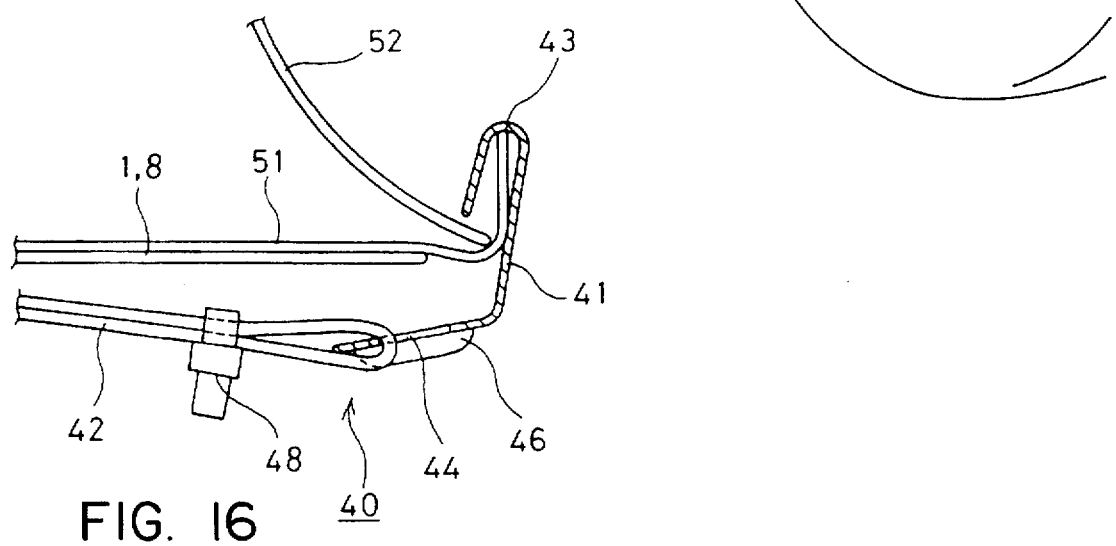
FIG. 16 is a sectional view of said another form of locking element for the working protection cover of the invention as seen when in use.

FIG. 14 shows another embodiment of locking element for the working protection cover of the invention. This locking element 40 comprises a locking element body 41 and a rubber-made resilient member 42.

The locking element body 41 is made of nylon, PP, PE or the like, but without limitation. The locking element Body 41 is comprised of a rectangular plate member such that the forward end thereof is bent into U shape to form a locking portion 43, a central portion of the plate member being obtusely bent in the same direction as the locking portion 43. The locking element body 41 is formed in its rear end portion with a slot 44, with an arcuate notch 45 formed centrally in the slot 44. At the rear end of the locking element body 41 and along both side edges thereof there are formed projections 46 for use as a finger catch. A rubber-made resilient member 42 is passed through the slot 44 and is fastened by a fastening band 48. The rear end portion of the resilient member 42 is passed through two slots 49 formed in the working protection cover 1, 8 and is fastened by a fastening band 50. Means for such fastening or banding is not necessarily be a fastening band.

When the locking element 40 is to be used, the working protection cover 1, 8 is placed over a bumper cover 51 at a stage prior to the bumper cover being mounted in position. The locking portion 43 is locked to both end edges of the bumper cover 51. Once the locking portion 43 is locked in position, the resilient member 42 acts to pull the locking element body 41 rearward and, therefore, the locking portion 43 positively comes in lock engagement with both end edges of the bumper cover 51 so that it will not become disengaged.

After the bumper cover 51 with the working protection cover 1, 8 placed thereon is mounted to the vehicle body, a mat guard 52 is attached to the vehicle body. Unlike any conventional locking element, the locking element of the invention is such that the locking element body 41 is constructed of a thin plate member, the mat guard 52 can be mounted in position even in such a condition that the locking element 40 is locked to the bumper cover 51.

The locking element 40 is easy to remove. When removing the locking element 40, the operator can easily finger catch the projections 46 at both side edges of the locking member body 41 and can easily remove the locking element 40 even if he wears gloves.

What is claimed is:

1. A flexible protective cover for covering a vehicle body component to partially protect the vehicle body component from being damaged during a vehicle assembly operation, said protective cover comprising:

a thermoplastic resin sheet having a predetermined shape, and having upper and lower surfaces and being formed to fit on a portion of the vehicle body component without losing shape;

a non-woven cloth sheet having upper and lower surfaces, the upper surface of said cloth sheet being bonded to the lower surface of said thermoplastic resin sheet;

a non-slip tape made of a foam material composed of polyolefin resin and synthetic rubber and having a large coefficient of friction;

said non-slip tape being bent along its longitudinal center and bonded to the protective cover wherein the bent non-slip tape sandwiches the peripheral edge of the protective cover to prevent the protective cover from slipping off the vehicle body component, said non-slip tape having an outer surface; and a protective sheet bonded to the outer surface of said non-slip tape in order to protect said non-slip tape and to facilitate separation of protective covers from each other when said protective covers are stacked in a plurality of layers.

2. A protective cover as set forth in claim 1, wherein the thermoplastic sheet is made of a polyolefin resin or a thermoplastic elastomer (TPE).

3. A protective cover as set forth in claim 1, wherein the non-slip tape is bonded to an outer peripheral edge of the protective cover and has a protective sheet bonded to an outer surface of the non-slip tape at one side of a longitudinal central axis dividing said non-slip tape.

4. A flexible protective cover as set forth in claim 1, said protective cover having a lower surface for contacting the vehicle body, wherein the non-slip tape is made of a foam material composed of polyolefin resin and synthetic rubber, said non-slip tape being bonded to the lower surface of the protective cover for contacting with the vehicle body.

5. A protective cover as set forth in claim 1 wherein said protective sheet is made of polyethylene.

* * * * *